United States Patent
Kageyama et al.

(10) Patent No.: US 8,090,152 B2
(45) Date of Patent: Jan. 3, 2012

(54) ROAD LANE BOUNDARY DETECTION SYSTEM AND ROAD LANE BOUNDARY DETECTING METHOD

(75) Inventors: Shioya Kageyama, Toyota (JP); Tomoyasu Tamaoki, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 402 days.

(21) Appl. No.: 12/472,421

(22) Filed: May 27, 2009

(65) Prior Publication Data
US 2009/0296987 A1  Dec. 3, 2009

(30) Foreign Application Priority Data

May 27, 2008 (JP) ................. 2008-138197

(51) Int. Cl.
*G06K 9/00* (2006.01)

(52) U.S. Cl. .................... 382/104; 382/199
(58) Field of Classification Search .......... 382/103, 382/104, 199, 286; 348/118; 701/28
See application file for complete search history.

(56) References Cited

U.S. PATENT DOCUMENTS

| | | | | |
|---|---|---|---|---|
| 5,790,403 A | * | 8/1998 | Nakayama | 701/28 |
| 6,591,000 B1 | * | 7/2003 | Oike et al. | 382/104 |
| 6,850,628 B2 | * | 2/2005 | Shirato | 382/104 |

FOREIGN PATENT DOCUMENTS

| | | |
|---|---|---|
| JP | 8005388 | 1/1996 |
| JP | 08087700 A | 4/1996 |
| JP | 2007072512 | 3/2007 |
| JP | 2007141052 A | 6/2007 |
| JP | 2007179386 A | 7/2007 |
| JP | 2007235414 | 9/2007 |

\* cited by examiner

*Primary Examiner* — Phuoc Tran
(74) *Attorney, Agent, or Firm* — Gifford, Krass, Sprinkle, Anderson & Citkowski, P.C.

(57) ABSTRACT

A road lane boundary detection system includes a detection region setting unit that sets a certain region in a road image, as a target detection region to be searched for detection of a road lane boundary, and a detecting unit that processes image data in the target detection region set by the detection region setting unit, so as to detect the road lane boundary. The detection region setting unit sets a first detection region as the target detection region if no road lane boundary is detected, and sets a second detection region as the target detection region if the road lane boundary is detected, such that the first and second detection regions are different in size from each other.

6 Claims, 11 Drawing Sheets

ROAD LANE BOUNDARY DETECTION SYSTEM AND ROAD LANE BOUNDARY DETECTING METHOD

INCORPORATION BY REFERENCE

The disclosure of Japanese Patent Application No. 2008-138197 filed on May 27, 2008 including the specification, drawings and abstract is incorporated herein by reference in its entirety.

BACKGROUND OF THE INVENTION

1. Field of the Invention

The invention relates to system and method for detecting road lane boundaries, and more particularly to such system and method for detecting road lane boundaries, based on image data representing a captured image of a road ahead of the vehicle.

2. Description of the Related Art

A road lane boundary detection system for a vehicle is known which is operable to detect road lane boundaries, such as white lines, which are drawn on a road and define a lane in which the vehicle runs. This system is configured to detect road lane boundaries by processing an image (image data) captured by a camera installed on the own vehicle for taking pictures of a region ahead of the vehicle. For example, the system extracts an image of a certain specific size to be compared, from the captured image, and determines whether the extracted image to be compared matches any of registered images relating to particular objects, using image processing, such as digitization, edge detection and filtering, of the image. If it is determined that the extracted image matches a registered image relating to a particular object, it is recognized that the particular object is present in the captured image. In this manner, white lines, or the like, are detected. The road lane boundary detection system of this type is required to detect white lines, or the like, on the road ahead of the vehicle, from moment to moment at very short time intervals of $1/10$ sec. to $1/100$ sec. However, an enormous amount of computations are needed to carry out a detecting process for detecting white lines, or the like, with respect to all of the pixels of the captured image. Accordingly, various approximations or simplifications are performed in each step of the process leading to detection of white lines, or the like.

For example, an image recognition system (as disclosed in, for example, Japanese Patent Application Publication No. 2007-235414 (JP-A-2007-235414)) is configured to limit a range to be searched for a certain object or objects, in an image captured from a mobile unit, so as to reduce the load on the system for image recognition processing. With this technology, a range within which imaging is possible is divided into a range delimited by a boundary to which the vehicle is able to reach after a lapse of a specified time, and a range beyond the boundary, into which the vehicle is not able to reach within the specified time. Then, the system limits a range on which the image recognition process is performed, to the range that can be reached by the vehicle, so as to reduce the processing load on the system for processing, such as extraction of an image to be compared with the registered image(s), and comparison between the image to be compared and the registered image(s).

Also, a system (as disclosed in, for example, Japanese Patent Application Publication No. 2007-72512 (JP-A-2007-72512)) is configured to set a close region that is relatively close to the vehicle and a remote region that is farther than the close region, in an image captured from a mobile unit, for use in detection of road lane boundaries, such as solid lines or broken lines. With this technology, when the system reads image data, it divides a region to be processed in the image, into the close region that is relatively close to the vehicle, and the remote region that is farther than the close region, and set these regions for use in subsequent processing. Also, the system has a solid line detection mode for detecting solid lines, and an intermittent line detection mode for detecting broken lines. In the solid line detection mode, the system sets twenty detection lines parallel to the X axis so as to equally divide the distance on the Y axis in the region into twenty sections, with respect to each of the close region and the remote region. In the intermittent line detection mode, on the other hand, the system sets forty detection lines parallel to the X axis so as to equally divide the distance on the Y axis in the region into forty sections, with respect to the close region, for example. Here, the detection lines set on the image provide equally spaced lines in real space. FIG. 16 is a view showing the corresponding positions of the detection lines in the real space, which indicates detection lines on the road as viewed from above. Since the detection lines are arranged so as to be spaced at equal intervals in the real space, as shown in FIG. 16, the detection lines provide unequally spaced lines on the image, as shown in FIG. 17. Once the system sets the detection lines in this manner, it differentiates the brightness (density) of pixel in the X-axis direction, with respect to each pixel on each detection line, and extracts or picks up coordinates of points at which the absolute value of the differential exceeds a threshold value A, as feature points, based on which road lane boundaries are detected.

However, the systems as disclosed in the above-identified patent publications suffer from some problems as follows. First, so-called Botts dots (dots each having a diameter of about 10 cm) are known as one type of road lane boundaries or markings provided on the road in place of white lines. Unlike the white lines, the Botts dots are intermittently arranged or spaced at given intervals on the road. On the road on which each road lane boundary consists of these intermittent markings, it would be easy to assume or recognize a single road lane boundary from these intermittent markings via human eyes. However, in the case where a system, like the systems as described above, mechanically recognizes road lane boundaries in the form of imaginary or substantial lines, through image processing on an image that is captured by a camera and that includes the intermittent markings, the road lane boundaries may not be appropriately detected. Even if the region to be processed on the captured image is limited as in the system of JP-A-2007-235414, and a detecting process is performed using spaced detection lines by which the distance on the Y axis in the region is equally divided into twenty or forty sections, as in the system of JP-A-2007-72512, feature points, or the like, associated with Botts dots that are present between the detection lines cannot be acquired, due to the fact that the Botts dots are intermittently arranged, and accurate detection cannot be achieved.

It may be proposed to subject all lines (all pixels) of the captured image to the processing for detection, without extracting or selecting detection lines from all lines. In this case, however, an enormous amount of computations are needed, and the processing load increases, thus making it difficult to quickly acquire necessary information. It may also be proposed to divide the region to be processed in the image, into a close region that is relatively close to the vehicle and a remote region that is farther than the close region, and limit the object to be processed to the close region so that all lines of the close region are searched for detection, thereby to reduce the processing load. Although this method is useful in a detecting process performed, for example, when the vehicle starts running, or for the purpose of "finding" Botts dots, etc., it is necessary to continue searching for Botts dots on the road (i.e., tracking Botts dots) after the Botts dots are initially found, so as to recognize the Botts dots as road lane boundaries. In this case, since the object to be processed is limited to the close region, the detecting process is only performed on, for example, a region up to 10 m ahead of the vehicle, resulting in a problem with the accuracy with which Botts dots are detected during running of the vehicle, for example.

SUMMARY OF THE INVENTION

The present invention provides system and method for detecting road lane boundaries that are able to accurately recognize lane boundaries, such as Botts dots or white lines, without increasing the processing load.

According to a first aspect of the invention, there is provided a road lane boundary detection system for detecting a road lane boundary provided on a road, from a road image that is a captured image of a road ahead of a vehicle, which includes a detection region setting unit that sets a certain region in the road image, as a target detection region to be searched for detection of the road lane boundary, and a detecting unit that processes image data in the target detection region set by the detection region setting unit, so as to detect the road lane boundary. In the road lane boundary detection system, the detection region setting unit sets a first detection region as the target detection region if no road lane boundary is detected, and sets a second detection region as the target detection region if the road lane boundary is detected, such that the first detection region and the second detection region are different in size from each other.

According to the first aspect of the invention, it is possible to detect road lane boundaries with high accuracy, while suppressing or avoiding an increase in the processing load on a processor of the system.

In the system of the first aspect of the invention, the detection region setting unit may set the second detection region such that the width of the second detection region is smaller than that of the first detection region.

With the above arrangement, the same advantageous effects as those of the first aspect of the invention can be obtained.

In the system as described above, the detection region setting unit may include: an initial detection region setting unit that sets, in the road image, an initial detection region of a certain size which is positioned at a first distance from the vehicle in real space and has a first dimension as measured in a width direction of the road, as the target detection region, a close detection region setting unit that sets a close detection region that is positioned at a distance substantially equal to the first distance from the vehicle in real space, and has a second dimension as measured in the road width direction, which is smaller than the first dimension of the initial detection region, as the target detection region, and a remote detection region setting unit that sets a remote detection region that is positioned at a second distance that is larger than the first distance from the vehicle in real space, and has a third dimension as measured in the road width direction, which is smaller than the first dimension of the initial detection region, as the target detection region. In this system, the detecting unit may process image data in the initial detection region if no road lane boundary is detected, so as to detect a road lane boundary, and may process image data in the close detection region and the remote detection region if the road lane boundary is detected, so as to detect the road lane boundary.

With the above arrangement, when no road lane boundary is detected, a relatively wide range of only the close region of the vehicle, in the road image, is set as a detection region to be searched for detection of a road lane boundary. Once any road lane boundary is detected, the detection range is narrowed, and the narrowed range of the close region, and the remote region, are searched for the road lane boundary. It is thus possible to detect road lane boundaries with high accuracy, without increasing the processing load.

In the system as described above, the close detection region setting unit may set a position of the close detection region as viewed in the road width direction in the road image, based on a position of the road lane boundary detected by the detecting unit using the initial detection region, and the remote detection region setting unit may set a position of the remote detection region as viewed in the road width direction in the road image, based on the position of the road lane boundary detected by the detecting unit using the initial detection region.

In the system as described just above, the close detection region setting unit my set the position of the close detection region in the road image, such that the road lane boundary detected by the detecting unit using the initial detection region is located at a center of the close detection region as viewed in the road width direction, and the remote detection region setting unit may set the position of the remote detection region in the road image, such that the road lane boundary detected by the detecting unit using the initial detection region is located at a center of the remote detection region as viewed in the road width direction.

With the arrangements as described above, the positions of the close detection region and remote detection region are set based on the position of the initially detected road lane boundary in the road image. It is thus possible to detect road lane boundaries with high accuracy, without increasing the processing load.

In the system of the first aspect of the invention, the target detection region may comprise a pair of regions that are separated from each other in the road width direction, and each of the regions may have a width that contains each of left and right lane boundaries located to the left and right of the vehicle.

With the above arrangement, the processing load arising in the detection process can be further reduced.

In the system of the first aspect of the invention, the road lane boundary may be in the form of Botts dots.

In the above case, the system is able to detect Botts dots that are intermittently arranged on the road, with high accuracy, while suppressing or avoiding an increase in the processing load.

According to a second aspect of the invention, there is provided a road lane boundary detecting method for detecting a road lane boundary provided on a road, from a road image that is a captured image of a road ahead of a vehicle, which includes: setting a certain region in the road image, as a target detection region to be searched for detection of the road lane boundary, and processing image data in the target detection region so as to detect the road lane boundary. In this method, a first detection region is set as the target detection region for use in a condition where no road lane boundary has been detected, and a second detection region is set as the target detection region for use in a condition where the road lane boundary has been detected, such that the first detection region and the second detection region are different in size from each other.

According to the second aspect of the invention, the same advantageous effects as those of the first aspect of the invention can be obtained.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

An exemplary embodiment of the invention will be described with reference to the drawings. It is to be understood that the invention is not limited to this embodiment.

Figure 1:
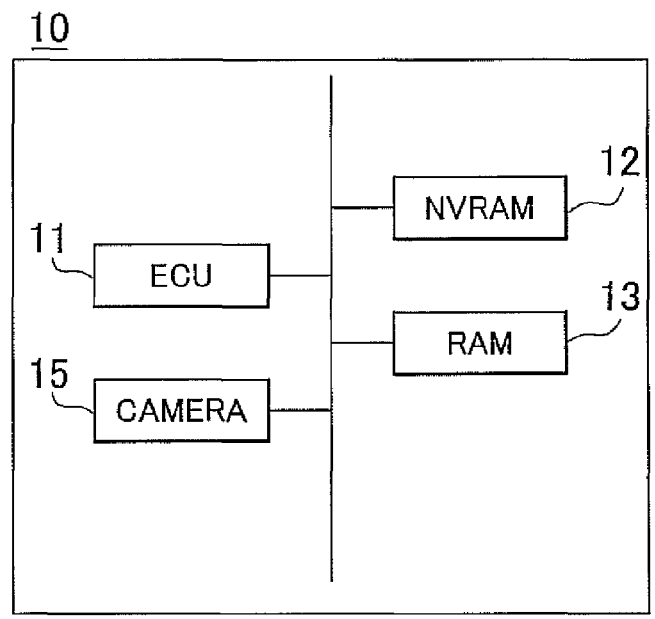
FIG. 1 is a functional block diagram of a road lane boundary detection system according to one embodiment of the invention.

FIG. 1 is a functional block diagram showing an example of the configuration of a road lane boundary detection system 10 (which will be simply called "detection system") according to the present invention. The detection system 10 consists essentially of an ECU (Electronic Control Unit) 11, NVRAM (Non-Volatile Random Access Memory) 12, RAM (Random Access Memory) 13, and a camera 15.

The ECU 11 performs certain computations, based on a signal from the camera 15 and information stored in the NVRAM 12 and the RAM 13, so as to perform processing as will be described later.

The NVRAM 12 is a non-volatile rewritable storage medium, and stores programs, or the like, for executing procedures as will be described later. The ECU 11 retrieves these programs from the NVRAM 12 and expands them in the RAM 13, so that the detecting system 10 performs a detecting process according to this embodiment of the invention.

The RAM 13 is a volatile, rewritable storage medium, and is used as a workspace of the ECU 11. Also, the RAM 13 temporarily stores data received from the camera 15.

The camera 15 is a vehicle-mounted imaging means, and may be, for example, a CCD (Charge-Coupled Device) camera or CMOS (Complementary Metal-Oxide Semiconductor) camera installed at a location (e.g., on a front grille or in the vicinity of the room mirror in the vehicle compartment) which is suitable for capturing a basic image as viewed in the travelling direction of the vehicle or an image of the environment surrounding the vehicle. The imaging means may also be a video camera for taking moving video pictures, or a still camera for taking still pictures, or an infrared camera capable of taking pictures in the nighttime.

The NVRAM 12 also stores information concerning the camera 15, including the angle of the field of view indicating the range over which pictures can be taken, the angle of installation, shutter speed, the total number of pixels, f number or stop number, shooting distance, shooting delay time as a period of time from a certain picture-taking to the next one or until image processing for the next image frame becomes possible.

Referring next to FIG. 2 through FIG. 10, a road lane boundary detection process contemplated in this embodiment will be generally described. In the lane boundary detection process of this embodiment, an image of a road ahead of the vehicle, which was picked up by the camera 15, is captured, and suitable image processing (such as line scanning) as will be described later is performed on the captured image, for detection of road lane boundaries. The road lane boundary detection process is started, for example, at the time when the ignition switch is turned on. The content of this process is roughly divided into a process (which will be called "initial finding process") for finding road lane boundaries, such as white lines or Botts dots, and a process (which will be called "tracking process") for tracking the road lane boundaries thus found. At first (i.e., before the vehicle starts running), the initial finding process is executed for finding road lane boundaries. Subsequently, the tracking process is executed for continuing detecting (recognizing) the road lane boundaries during vehicle running, based on the position, shape, etc. of each of the lane boundaries found in the initial finding process. Then, various functions, such as a lane keeping assist function, are performed, based on the lane boundaries detected in this manner. In the following explanation, white lines and Botts dots are taken as examples of the road lane defining lines. The white lines mentioned herein include "solid lines" that are continuously drawn on the road, and "broken lines" that consist of short lines that are successively arranged in line at substantially equal intervals.

Figure 2:
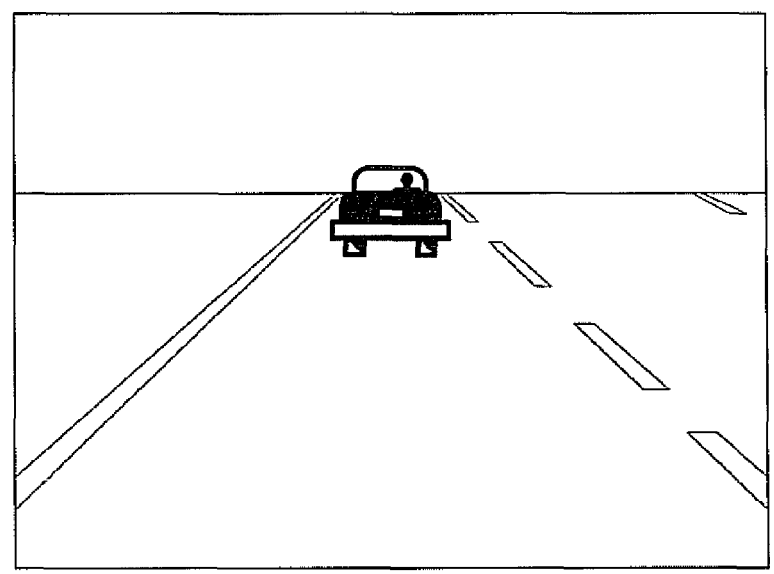
FIG. 2 is a view schematically showing a camera image.
Figure 3:
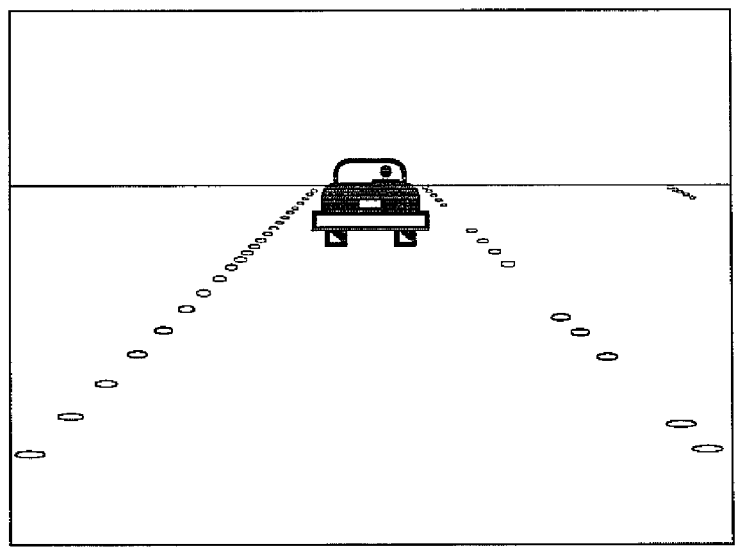
FIG. 3 is a view schematically showing a camera image.

FIG. 2 and FIG. 3 schematically show camera images (road images) captured by the camera 15. FIG. 2 is a camera image in which white lines are illustrated as an example of road lane boundaries, and FIG. 3 is a camera image in which Botts dots are illustrated as an example of road lane boundaries.

In this embodiment, a process for detecting white lines is initially executed as the above-mentioned initial finding process. Here, any method for detecting white lines may be employed. For example, the white-line detection process is performed by setting suitably extracted or selected detection lines on a camera image, and performing line scanning on the detection lines so as to calculate feature points of, for example, the brightness. Because white lines are not discontinuously arranged (i.e., extend continuously), detection of these lines is possible even if the extracted detection lines are used. If any white line is detected as a result of the above process, the white line continues to be detected in the subsequent tracking process. With the thus detected white lines being regarded as road lane boundaries, various functions, such as a lane keeping assist function, are executed.

Figure 4:
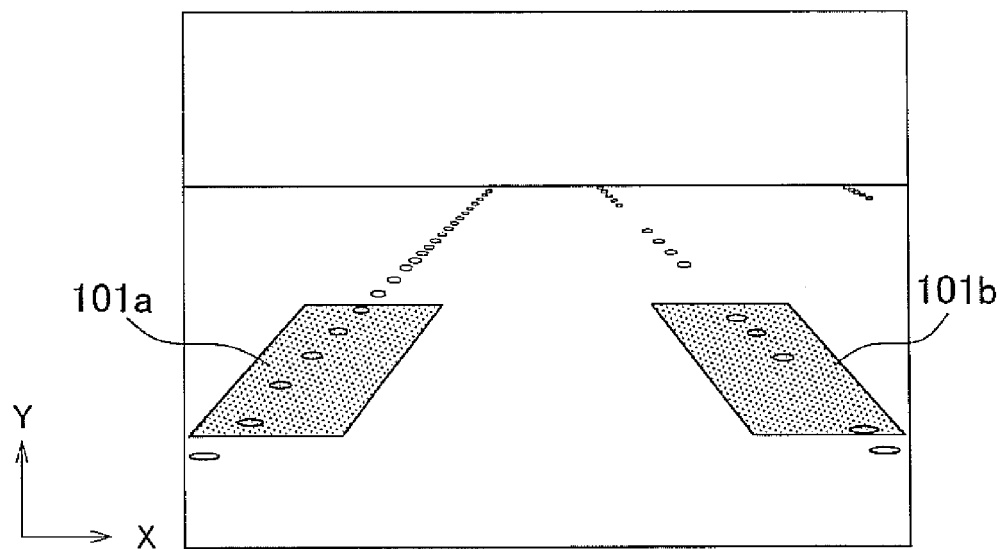
FIG. 4 is a view showing one example of initial detection areas.
Figure 5:
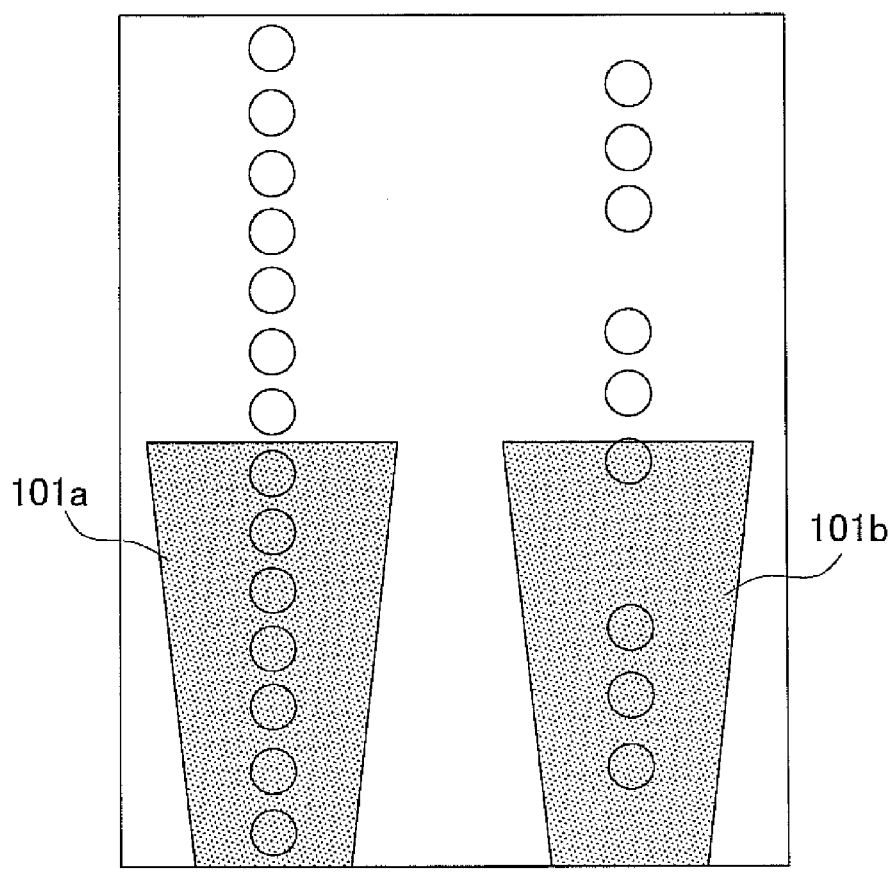
FIG. 5 is a view showing the corresponding positions of the initial detection areas in real space.

If no white line is detected in the initial finding process, a process for detecting Botts dots (in other words, initial finding of Botts dots) is then executed. When the system attempts to detect Botts dots in a camera image, using line scanning, the extraction of the detection lines (i.e., reduction of the number of detection lines) as described above should not be conducted since the Botts dots are discontinuously arranged on the road. However, if the detecting process is performed with respect to all of the pixels (all lines) of the camera image, the processing load will increase. In this embodiment, therefore, target detection areas to be searched for detection of Botts dots are set as shown in FIG. 4, in order to reduce the processing load. FIG. 4 schematically shows target detection areas 101a, 101b to be searched for detection of Botts dots during the initial finding process. These detection areas 101a, 101b will be called "initial detection areas". In the following explanation, the areas 101a, 101b may be simply called "initial detection area 101" as a generic term of these two areas. In FIG. 4, the X axis represents the width direction of the road, and the Y axis represents the longitudinal direction of the road. As shown in FIG. 4, the initial detection areas 101a, 101b are set as left and right areas in a lower section of the camera image (namely, on one side closer to the vehicle). FIG. 5 is a bird's eye view of FIG. 4, showing the initial detection areas 101a and 101b of FIG. 4 as viewed from above in real space or on real coordinates. As shown in FIG. 5, the initial detection areas 101a and 101b are set such that Botts dots are placed at the center on the X axis of each of the areas. A detecting process is performed on all lines contained in the initial detection areas 101a and 101b, for detection of Botts dots. In this embodiment, top-hat conversion of morphology operations is used for detection of Botts dots, as will be described in detail later.

Figure 6:
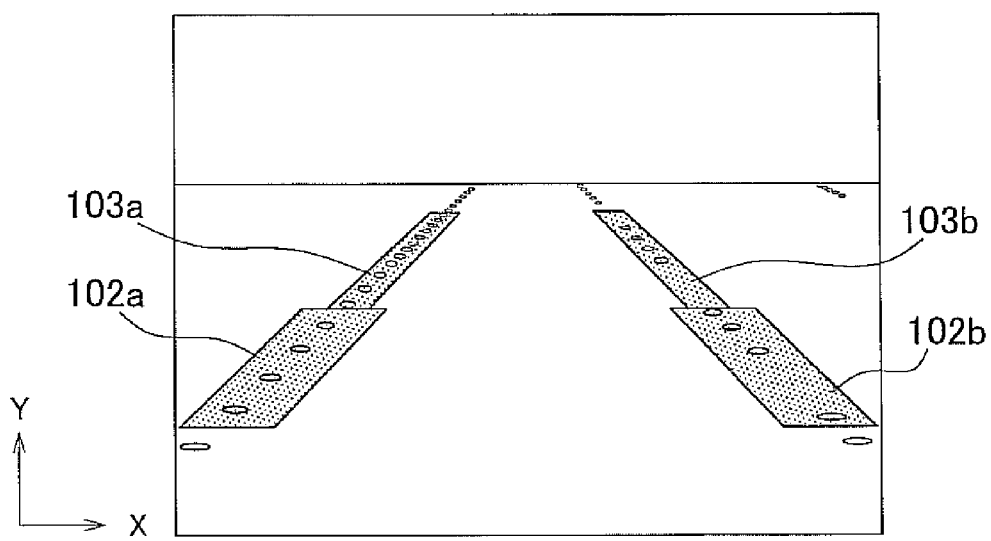
FIG. 6 is a view showing one example of areas to be searched in a tracking process.
Figure 7:
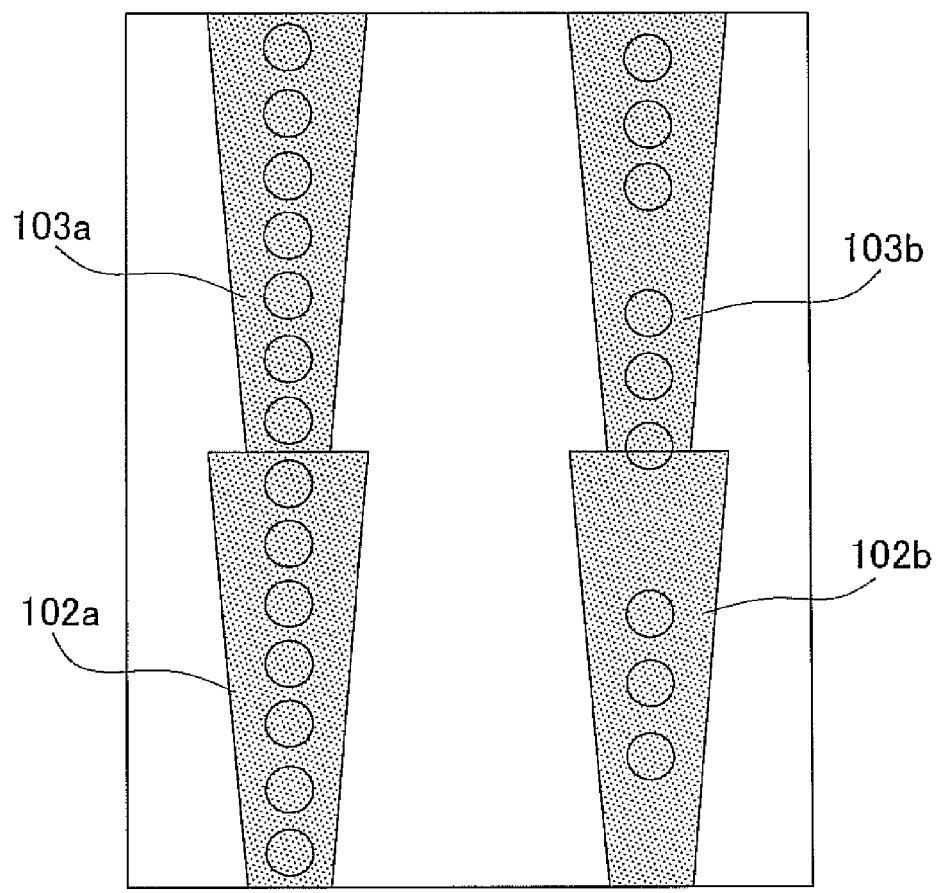
FIG. 7 is a view showing the corresponding positions of the areas to be searched in the tracking process, in real space.

If Botts dots are detected, the system continues detecting or monitors Botts dots in the subsequent tracking process. In the tracking process, areas as shown in FIG. 6 are set as target detection areas. FIG. 6 schematically shows target detection areas (which will be called "tracking target detection areas") to be searched during the tracking process for detection of Botts dots. FIG. 7 is a bird's eye view of FIG. 6, showing the tracking target detection areas of FIG. 6 as viewed from above in real space. As shown in FIG. 6, the tracking target detection areas include two areas 102a and 102b as left and right areas in a lower section (closer to the vehicle) of the camera image, and two areas 103a and 103b as left and right areas located above the areas 102a, 102b, respectively. The areas 102a and 102b will be called "close detection areas". In the following description, the areas 102a, 102b may be simply called "close detection area 102" as a generic term of these two areas. The areas 103a and 103b will be called "remote detection areas". In the following description, the areas 103a, 103b may be simply called "remote detection area 103" as a generic term of these two areas. On the camera image as shown in FIG. 6, the width or lateral dimension of the close detection areas 102a and 102b is somewhat narrower or smaller than that of the initial detection areas 101a and 101b. Also, the width or lateral dimension of the remote detection areas 103a and 103b is further narrower than that of the close detection areas 102a and 102b. In the real space as shown in FIG. 7, the close detection area 102 and the remote detection area 103 are depicted as regions having the same size or area. Each of these regions is set as a range within which a road lane boundary is likely to be present on the road (the manner of setting the range will be described later). Thus, even where the regions have the same size in the real space, a remote one of the regions is indicated as a smaller region on the camera image. Therefore, on the camera image as shown in FIG. 6, the width of the remote detection areas 103a and 103b as measured in the camera image is further narrower than that of the close detection areas 102a and 102b. Namely, the remote detection areas 103a and 103b are set as areas having further narrowed detection ranges. As the detection range becomes narrower, the processing load associated with the detecting process as described above is reduced.

Figure 8:
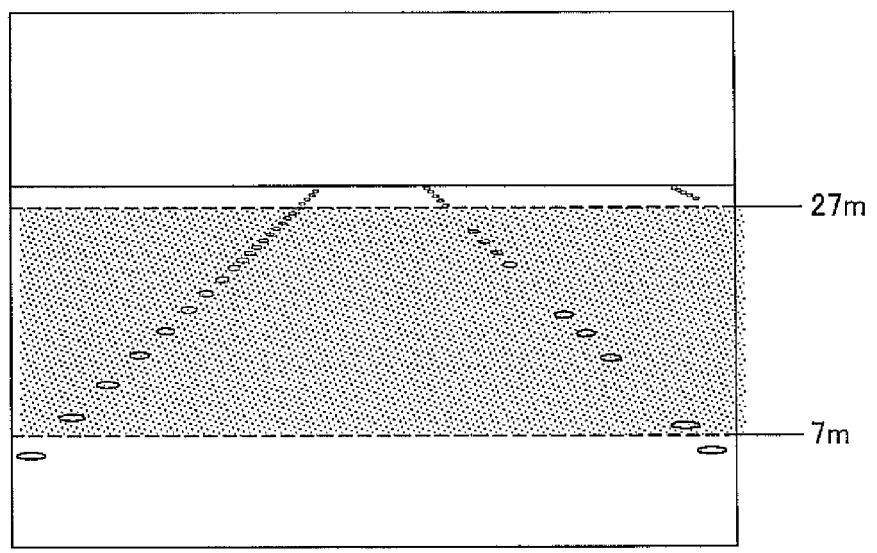
FIG. 8 is a view useful for explaining setting of an area to be searched.
Figure 9:
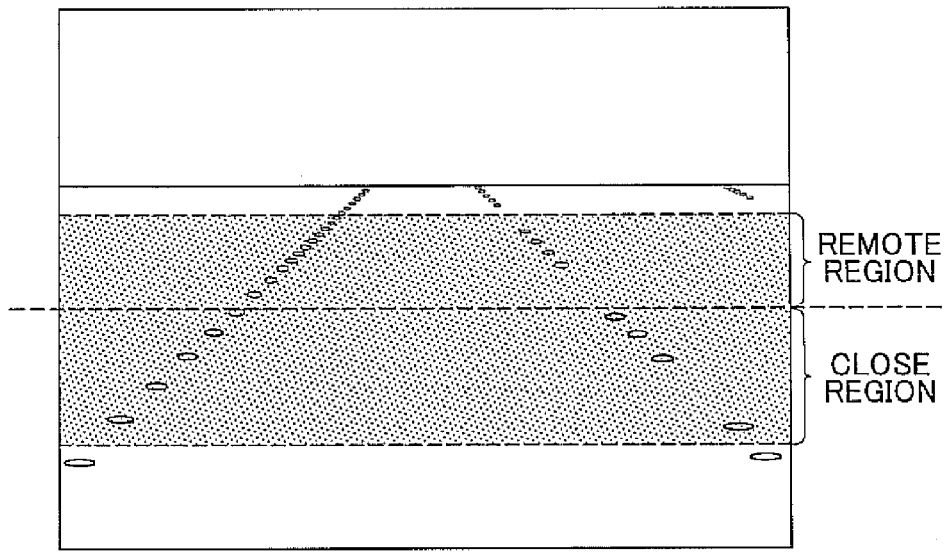
FIG. 9 is a view useful for explaining setting of areas to be searched.
Figure 10:
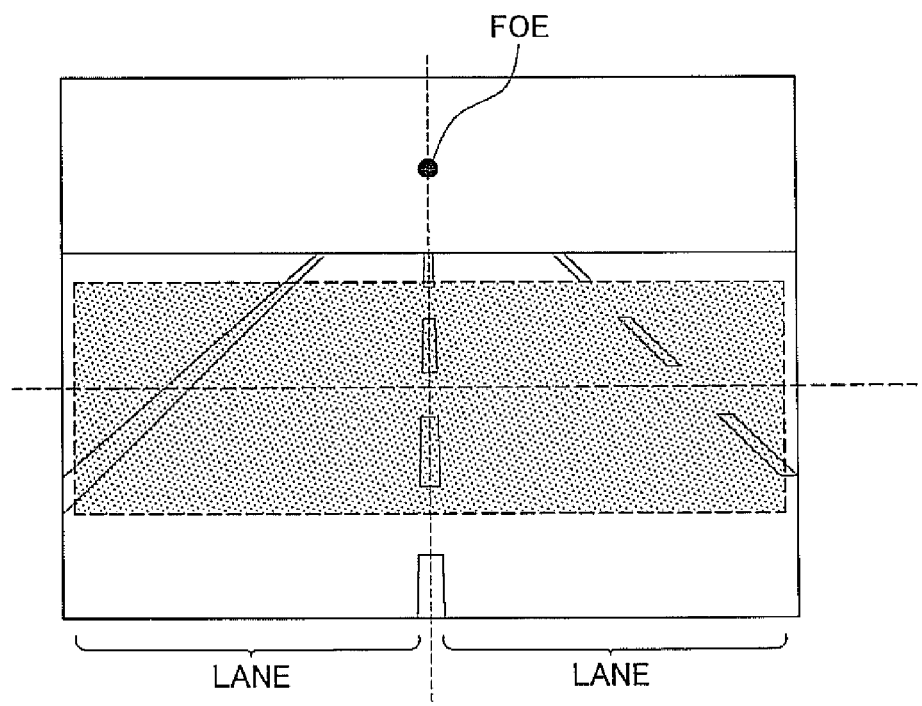
FIG. 10 is a view useful for explaining setting of areas to be searched.

The position and size of each detection area including the range within which a road lane boundary is likely to present on the road are calculated in advance, and data indicative of the results of calculation is stored in advance in a memory, or the like, as set data of the detection area. In operation, the set data is read from the memory and used in a process as will be described later. For calculation of the position and size of each of the detection areas, the vehicle is placed on a road of, for example, a test course or test track, on which white lines are drawn, and the position and size of the detection area are calculated in the manner as will be described below while the vehicle is actually running with white lines being detected, for example. Referring to FIG. 8 to FIG. 10, the manner of setting or calculating the position and size of each of the initial detection areas 101, close detection areas 102 and remote detection areas 103 will be explained.

Initially, as shown in FIG. 8, a vertical dimension, or a range as measured in the vertical direction, of an area to be searched for detection is set on a camera image. In the example of FIG. 8, a range delimited by two horizontal lines (bounds) ahead of the vehicle, which are spaced 7 m and 27 m, respectively, from the vehicle, in the real space is set as one example of target detection area on the camera image. One of the bounds of the range is set at 7 m ahead of the vehicle, in view of interruption by a bonnet (or hood) of a passenger car. The other bound is set at 27 mm ahead of the vehicle, in view of the resolution of the image, the range (30 m) of illumination in the nighttime, and so forth.

Next, the area of which the vertical dimension has been set is further divided into a close region that is relatively close to the vehicle, and a remote region that is farther than the close region, as shown in FIG. 9.

Furthermore, the width or lateral dimension is calculated assuming a situation where the vehicle makes a lane change. More specifically, supposing that the vehicle is located at the center of a lane, as shown in FIG. 10, the width that contains road lane boundaries (white lines in FIG. 10) at the outer sides of the left and right lanes is calculated and set. In addition, the position of the detection area with respect to the X axis is adjusted such that the FOE (Focus of Expansion) lies on a center line (vertical line in FIG. 10) located at the center on the X axis.

Next, the set content of the initial detection areas 101a and 101b is calculated from the regions set in the manner as described above. The initial detection areas 101a and 101b are set using only the close region. Initially, the close region is divided into left and right regions that are opposed to each other with respect to the center line that passes the FOE. Then, the width of each of the left and right regions is calculated. To calculate the width of each region, a process for detecting a road lane boundary (typically, a white line) is performed with reference to the position of the own vehicle at the time of a lane change as shown in FIG. 10, and the width is calculated and set in view of the R value (e.g., 200R) of a curve, with reference to the position of the detected road lane boundary. Namely, the width is calculated and set such that the lane (or lanes) whose image is captured by the camera 15 does not come out of the target detection area while the vehicle is running along a curve. At this time, the angle of view and resolution of the camera are also taken into consideration. As a result, the initial detection areas 101a and 101b as shown in FIG. 4 are calculated.

Next, the set content of the close detection areas 102a and 102b used in the tracking process is calculated. The respective positions of the close detection areas 102a and 102b on the X axis are determined with reference to the positions of the road lane boundaries found upon calculation and setting of the set content of the initial detection areas 101. Namely, each of the close detection areas 102a and 102b is positioned so that the corresponding road lane boundary lies at the center of the area 102a, 102b on the X-axis. On the other hand, the width or lateral dimension is calculated in view of the following points.

(1) Initially, the distance from the road lane boundary corresponding to each of the detection areas 102 to the road shoulder is taken into consideration, so that the road shoulder is prevented from being erroneously recognized as a road lane boundary. Therefore, the width of the close detection areas 102a and 102b is calculated and set to be narrower or smaller than that of the initial detection areas 101a and 101b.

(2) In addition, the behavior of the vehicle is taken into consideration. More specifically, the following two points are taken into consideration. First, a shift or variation in the display position of road lane boundaries from one frame of camera image to the next frame, which occurs when the vehicle makes a lateral movement, is taken into consideration. Suppose that one frame lasts $\frac{1}{10}$ second (namely, camera images are picked up at the intervals of $\frac{1}{10}$ second), and the vehicle is running with the steering wheel turned to the right. In this case, with respect to the positions of road lane boundaries, e.g., white lines, in a certain frame of camera image, the positions of the white lines in the next frame of camera image are slightly shifted to the left. The width of the close detection areas is calculated so that the road lane boundaries are contained in the close detection areas even when the vehicle makes a lateral movement, as in the above case. Secondly, the yaw angle of the vehicle sensed when the vehicle is oriented in a slanting direction with respect to the road lane boundaries is taken into consideration, assuming the case where the vehicle makes a lane change, for example. Upon a lane change, the longitudinal axis or running direction of the vehicle becomes inclined by one to two degrees with respect to the road lane boundaries, such as white lines. Therefore, the white lines that appear in the camera image are also slightly inclined. In the case of a vehicle on which a so-called lane keeping assist system is installed, for example, when the vehicle is about to depart from the lane on which the vehicle is currently running, appropriate torque is applied to an electric power steering, so as to assist the vehicle in keeping running on the current lane. The width of the close detection areas is calculated so that the white lines are contained in the close detection areas, in view of the yaw angle (the vehicle is temporarily oriented in a slanting direction with respect to the white lines) due to the torque produced in the above situation. The width of the close detection areas is calculated in view of the above-described points, and stored in a memory as set data.

Next, the remote detection areas 103 as shown in FIG. 6 are calculated. More specifically, the same points as those considered in calculation of the close detection areas 102 are examined with regard to the above-mentioned remote region, and the remote detection areas 103 are calculated and set in view of these points. It is, however, to be noted that, on the camera image, the road lane boundaries in the remote region appear in smaller size (or thinner) than those in the close region. The width of the remote detection areas 103, which is calculated based on the road lane boundaries, is set to a value that is further smaller or narrower than that of the close detection areas 102.

The target detection area to be searched for detection of Botts dots is limited to the close region in the initial finding stage, and includes or covers the remote region as well as the close region in the tracking stage, for the following reason. In the initial finding stage (where the presence of Botts dots has not yet been recognized), it is only required to grab the position of Botts dots, and there is a little necessity to include the remote region in the detection area to be searched. In the tracking stage, typically during running of the vehicle, it is required to detect Botts dots in a remote region, and keep recognizing the Botts dots as road lane boundaries. Thus, in the initial finding stage, only the close region is searched for detection of Botts dots, so as to grasp the position of the Botts dots without increasing the processing load. Since the purpose of the initial finding process is to initially find or detect Botts dots, the search range (the width of the area to be searched for detection) is set to be larger than that of the tracking process. Once the position of the Botts dots is found in the initial finding stage, the X-axis position of the Botts dots in the camera image is presumed not to change largely during subsequent running of the vehicle. Therefore, even if the width of the detection area is reduced with the thus found X-axis position set as the center of the area on the X axis, subsequent detection or monitoring of the Botts dots may be sufficiently accomplished. Thus, the width of the detection area in the tracking stage is set to be further smaller than that in the initial finding stage, so as to reduce the processing load. In the remote region, Botts dots appear in further reduced size on the camera image. Therefore, detection of Botts dots is possible even if the width of the remote detection areas 103 is set to be further smaller than that of the close detection areas 102, as shown in FIG. 6. While the processing load is reduced by reducing the width of the close detection areas 102, the processing power that has increased with the reduction in the processing load is utilized in the detecting process performed on the remote detection areas 103. As a result, the Botts-dots detecting process can be performed on both the close region and the remote region, without increasing the overall processing load.

In this embodiment, the Botts-dots detecting process is performed with the size of the detection area varied between the initial finding stage and the tracking stage, as described above. Thus, while the Botts-dots detection process generally requires large processing load associated with image processing, the above arrangement makes it possible to accomplish detection of Botts dots with high accuracy while keeping the overall processing load at a sufficiently low level.

Figure 11:
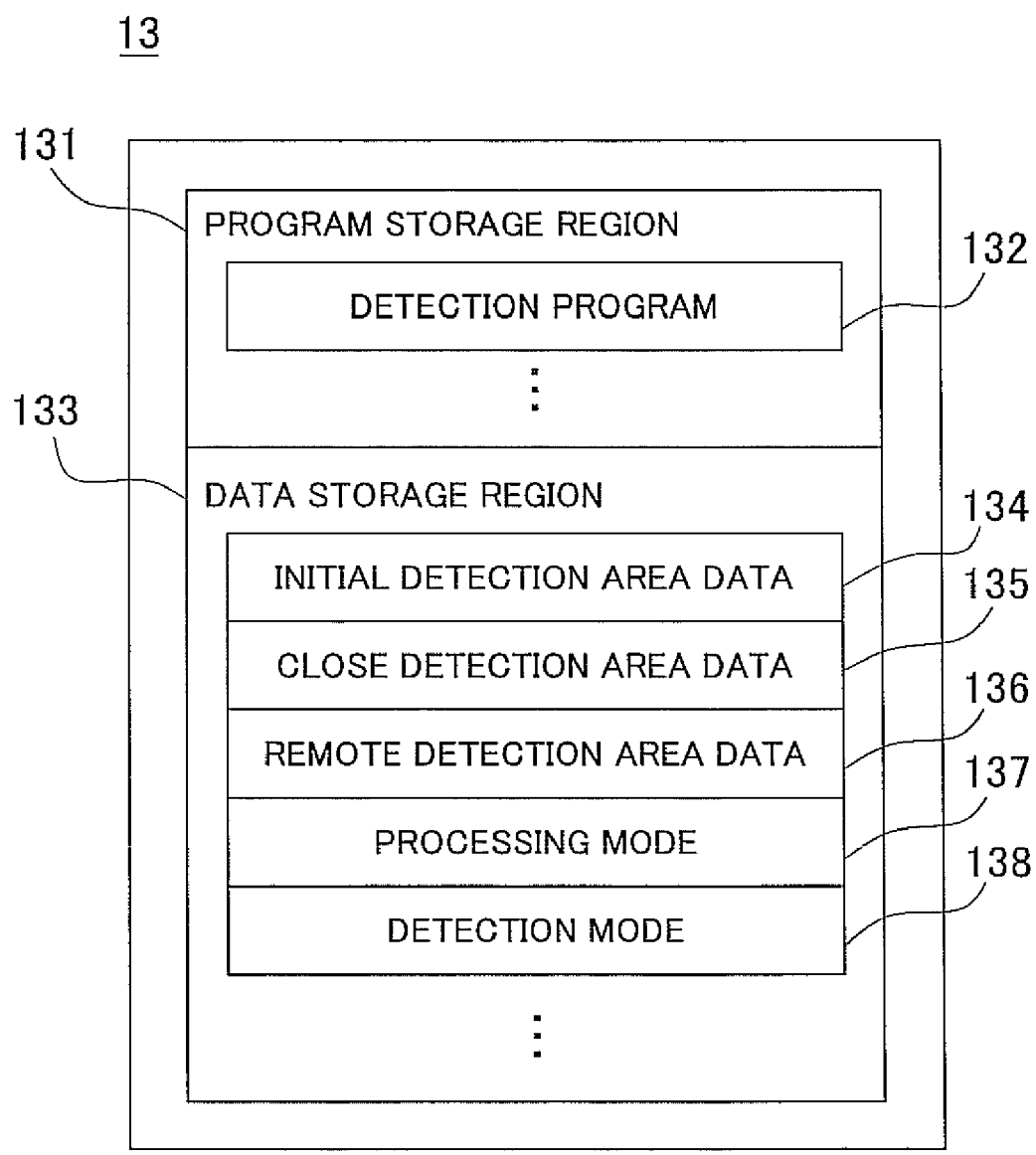
FIG. 11 is an illustration showing a memory map of a RAM shown in FIG. 1.

In the following, various kinds of data and programs used in this embodiment will be described in detail. Initially, various kinds of data used in this embodiment will be described. FIG. 11 is an illustration showing a memory map of the RAM 13 as shown in FIG. 1. In FIG. 11, the RAM 13 includes a program storage region 131 and a data storage region 133. Data stored in the program storage region 131 and the data storage region 133, which is stored in advance in the NVRAM 12, is copied from the NVRAM 12 to the RAM 13.

A detection program 132 to be executed by the ECU 11 is stored in the program storage region 131.

Various kinds of data, including initial detection area data 134, close detection area data 135, remote detection area data 136, processing mode 137, and detection mode 138, are stored in the data storage region 133.

The initial detection area data 134 indicates the position and size of each of the above-described initial detection areas 101a and 101b on the camera image.

The close detection area data 135 indicates the size of the above-described close detection areas 102a and 102b on the camera image. The remote detection area data 136 indicates the size of the above-described remote detection areas 103a and 103b on the camera image.

The date of the processing mode 137, which is a variable used in routines that will be described later, is a variable indicating which of the initial finding process and the tracking process as described above is to be executed.

The date of the detection mode 138, which is a variable used in routines that will be described later, is a variable used for determining whether "white lines" or "Botts dots" are to be detected.

Figure 12:
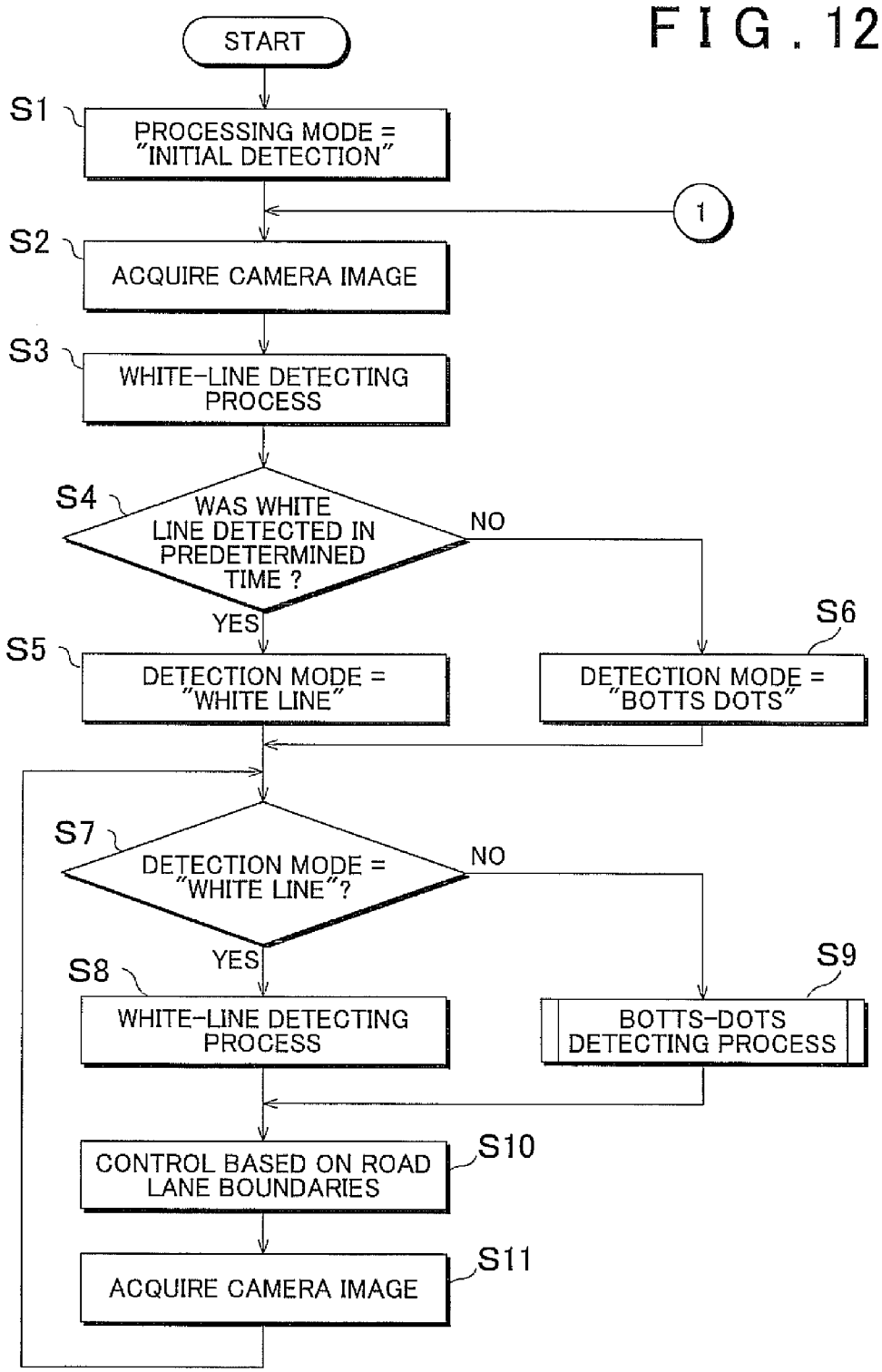
FIG. 12 is a flowchart illustrating the flow of a detecting process performed in the detection system.
Figure 13:
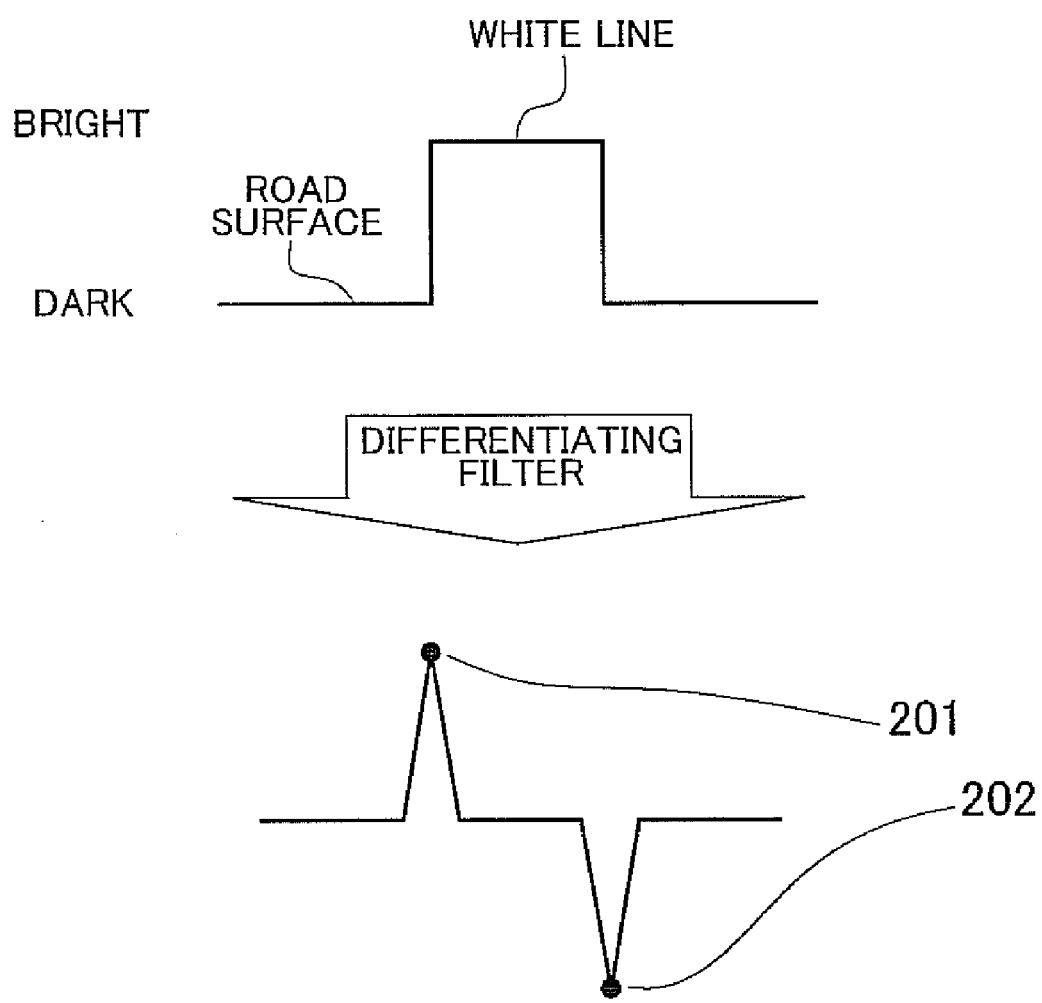
FIG. 13 is a view useful for explaining feature points of a white line.

Next the control flow of a detecting process performed in the detecting system 10 will be described with reference to FIG. 12 through FIG. 14. FIG. 12 is a flowchart illustrating the flow of the detecting process performed in the detecting system 10. When the ignition switch of the vehicle is turned on (i.e., when the power is turned on), the ECU 11 initializes each unit of the RAM 13, etc. Then, the detection program, etc. stored in the NVRAM 12 is read into the RAM 13 and execution of the detection program is started. Namely, when the ignition switch is turned on, a control routine as shown in the flowchart of FIG. 12 is started. In this embodiment, various processes performed in situations other than that of the detecting process are not directly related to the present invention, and therefore will not be explained herein. The processing loop of step S1 through step S11 as shown in FIG. 12 is repeatedly executed for each frame (i.e., at the intervals of 1/10 second in this embodiment).

In FIG. 12, the ECU 11 initially sets the processing mode 137 to "INITIAL DETECTION" (step S1). Subsequently, the ECU 11 acquires a camera image (more precisely, camera image data) from the camera 15 (step S2), and executes a process for detecting a white line from the image (step S3). More specifically, a retrieval region of a certain size is set in the acquired camera image. Then, scanning is conducted in the horizontal direction for each line in the retrieval region, and feature points of a white line (i.e., edge points: an edge that indicates the left-side boundary of the white line will be called "rise edge", and an edge that indicates the right-side boundary of the white line will be called "fall edge") are detected. Since a white line generally looks brighter, i.e., has a higher degree of brightness, than the road surface, those of pixels on each detection (or scanning) line, at which the brightness changes largely, are extracted as the feature points. The amount of change in the brightness is calculated using, for example, a differentiating filter. The feature points calculated in this manner represent boundary points (corresponding to the right end and left end of the white line) between the white line and the road. FIG. 13 is a view schematically showing feature points of a white line. In FIG. 13, the upper graph indicates the brightness measured along a scanning line on a camera image (detection area), and the lower graph indicates the amount of change in the brightness calculated by using the differentiating filter. When a white line is detected, as shown in FIG. 13, a pair of feature points 201 and 202 are present (the feature point 201 represents a rise edge, and the feature point 202 represents a fall edge). To the contrary, feature points that fail to provide a pair are determined as unnecessary feature points. Then, the unnecessary feature points are removed, and only the paired feature points, i.e., namely, the feature points that possibly provide a white line remain, thus permitting detection of a white line. Then, it is finally determined whether the feature points indicate a white line, based on the distance between the paired feature points, the positional relationship with feature points on other lines, and so forth. It is to be understood that the above-described method is a mere example but not a limiting one, and that any method may be used provided that a white line can be detected from a camera image.

Next, the ECU 11 determines whether a white line was detected within a predetermined time in step S3 (step S4). If it is determined that a white line was detected within the predetermined time in step S3 (i.e., if an affirmative decision (YES) is obtained in step S4), the ECU 11 sets "WHITE LINE" as the detection mode 138 (step S5). If no white line was detected within the predetermined time in step S3 (i.e., if a negative decision (NO) is obtained in step S4), on the other hand, the ECU 11 sets "BOTTS DOTS" as the detection mode 138 (step S6).

Next, the ECU 11 determines whether the detection mode 138 is "WHITE LINE" (step S7). If it is determined that the detection mode 138 is "WHITE LINE", a process for detecting a white line from a camera image is carried out (step S8). The content of this process is similar to that of step S3 as described above, and therefore will not be explained. If the detection mode 138 is not "WHITE LINE", on the other hand, the detection mode 138 is "BOTTS DOTS", and the ECU 11 performs a Botts-dots detecting process (step S9).

Figure 14:
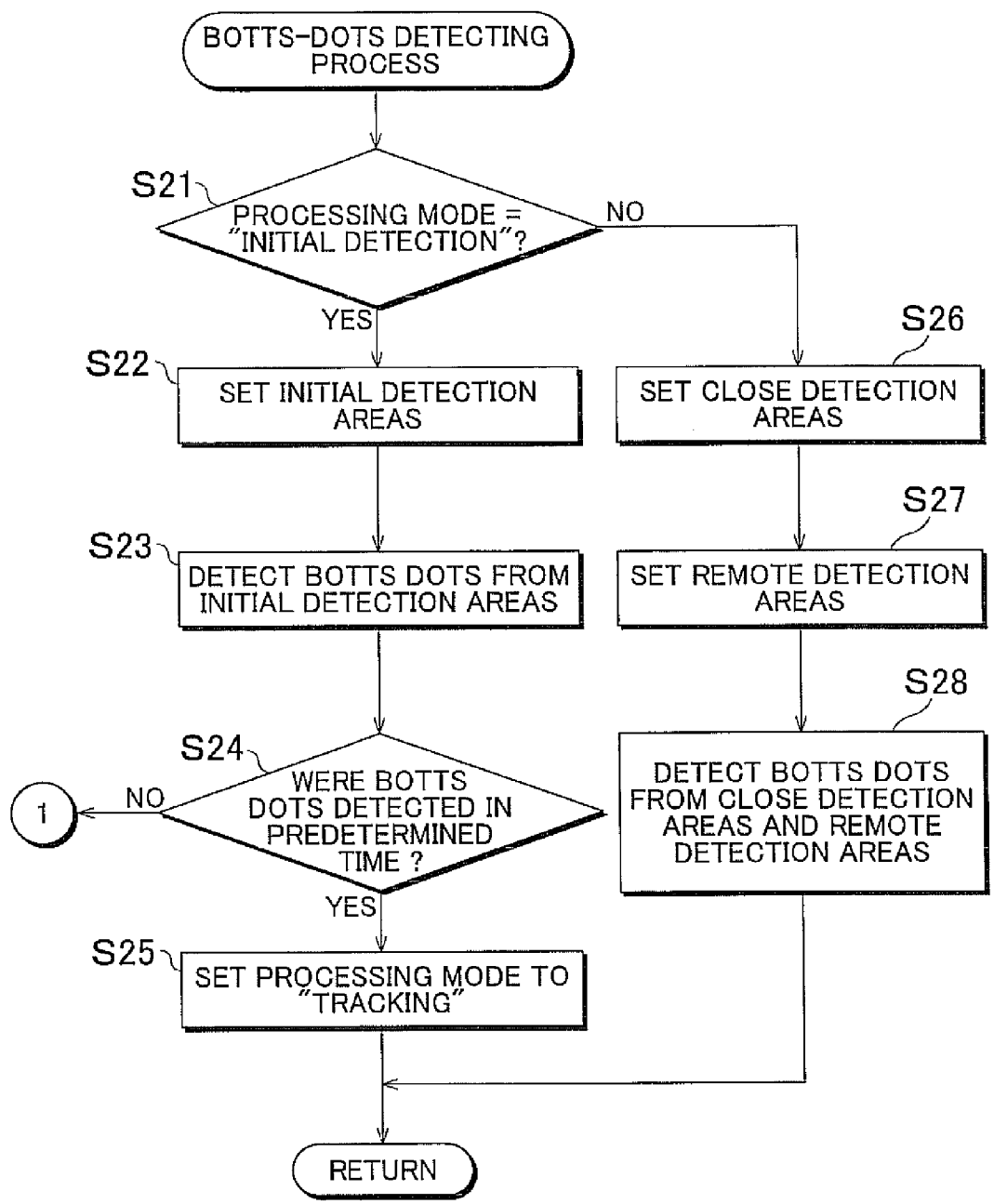
FIG. 14 is a flowchart illustrating details of a Botts-dots detection process indicated at step S9 in FIG. 12.

FIG. 14 is a flowchart showing details of the Botts-dots detecting process as indicated in step S9. In FIG. 14, the ECU 11 initially determines whether the processing mode 137 is "INITIAL DETECTION" (step S21). If it is determined that the processing mode 137 is "INITIAL DETECTION" (i.e., if an affirmative decision (YES) is obtained in step S21), an initial finding process for detecting Botts dots is performed. In this process, the ECU 11 sets the initial detection areas 101 (see FIG. 4) as described above (step S22). More specifically, the ECU 11 reads initial detection area data 134 from the RAM 13. Then, the ECU 11 sets the initial detection areas 101 as described above in the camera image acquired in step S2, based on the initial detection area data 134.

Subsequently, the ECU 11 performs an operation to detect Botts dots, with respect to the above-mentioned target initial detection areas (step S23). In this embodiment, top-hat conversion of morphology operations is used for detection of Botts dots. Initially, an image that has been subjected to "opening" processing is subtracted from the camera image. More specifically, the camera image is set as an image to be processed, and elements corresponding to Botts dots are set as "structural elements". The size of the structural elements is set to 10 cm, which is the size of Botts dots. Then, erosion (contraction) processing is performed. As a result, pixels having relatively low brightness erode pixels having relatively high brightness, and Botts dots which are smaller in size than the structural elements and have high brightness (more precisely, those that look like Botts dots, which will be called "Botts-dots candidates") disappear. Then, dilation processing is performed on the image that has contracted through the erosion processing. In the dilation processing, pixels having relatively high brightness erode pixels having relatively low brightness. Although the original image is restored if the once-contracted image is dilated or expanded, the Botts-dots candidates that have disappeared will not be restored. The processing up to this step is called "opening" processing. Consequently, an image (that has been subjected to the "opening" processing) is created in which the Botts-dots candidates have disappeared from the camera image.

Next, the image that has been subjected to the "opening" processing is subtracted from the camera image (namely, the top-hat conversion is performed), so as to create an image in which only the Botts-dots candidates that have disappeared through the "opening" processing remain. In the image thus created, the background is completely eliminated, and the Botts-dots candidates remain while keeping their original shapes.

Next, the ECU 11 extracts feature points of Botts dots, based on changes in the brightness of the image on which the top-hat conversion has been done. Then, Botts dots are detected based on the feature points. For example, each of the feature points thus extracted is regarded as a fall edge (corresponding to the feature point 202 in FIG. 13) of a white line in the white line detecting process as described above. Then, an imaginary rise edge is set at a certain distance (corresponding to the width of a typical white line) from the feature point in question. In this manner, a quasi white line can be set, on which the same operation as that used in the white line detecting process as described above is performed, so as to detect Botts dots as a road lane boundary (more precisely, detect Botts dots assuming that they are a quasi white line). The method as described above is a mere example, but not a limiting one, and any method may be used provided that Botts dots can be detected from a camera image.

Next, the ECU 11 determines whether Botts dots are detected within a predetermined time in step S23 (step S24). If it is determined that Botts dots are detected within the predetermined time in step S23 (i.e., if an affirmative decision (YES) is obtained in step S24), the ECU 11 sets the processing mode to "TRACKING" (step S25), and the Botts-dots detecting operation is finished. If, on the other hand, no Botts dots are detected within the predetermined time in step S23 (i.e., if a negative decision (NO) is obtained in step S24), the control returns to step S2, and the routine is repeated.

If it is determined in step S21 that the processing mode 137 is not "INITIAL DETECTION" (i.e., if a negative decision (NO) is obtained in step S21), on the other hand, a tracking process is executed. Initially, the ECU 11 performs an operation to set the close detection areas 102 (see FIG. 6) as described above (step S26). More specifically, the ECU 11 reads close detection area data 135 from the RAM 13. Then, the ECU 11 sets the close detection areas 102*a* and 102*b* as described above in the above-mentioned camera image, based on the close detection area data 135. At this time, the close detection areas 102*a* and 102*b* are set with reference to the positions of the Botts dots detected in step S23. More specifically, the ECU 11 sets the close detection area 102*a* such that the Botts dots detected in the initial detection area 101*a* in step S23 are positioned at the center of the close detection area 102*a* as viewed in the X-axis direction, namely, such that the Botts dots lie on the center line of the close detection area 102*a* as viewed in the X-axis direction. Likewise, the ECU 11 sets the close detection area 102*b* is set such that the Botts dots detected in the initial detection area 101*b* are positioned at the center or on the center line of the close detection area 102*b* as viewed in the X-axis direction.

Subsequently, the ECU 11 performs an operation to set the remote detection areas 103 (see FIG. 6) as described above (step S27). More specifically, the ECU 11 reads remote detection area data 136 from the RAM 13. Then, the ECU 11 sets the remote detection areas 103*a* and 103*b* as described above in the above-mentioned camera image, based on the remote detection area data 136. At this time, the ECU 11 sets the remote detection area 103*a* such that the center or midpoint of the bottom side of the remote detection area 103*a* as viewed in the X-axis direction lies on the center or midpoint of the top side of the close detection area 102*a* as viewed in the X-axis direction, (namely, the X-axis centers of the close detection area 102*a* and remote detection area 103*a* at the boundary thereof coincide with each other). Similarly, the ECU 11 sets the remote detection area 103*b* so that the X-axis centers of the remote detection area 103*b* and the close detection area 102*b* coincide with each other (i.e., the center lines of these areas 103*b*, 102*b* as viewed in the X-axis direction align with each other). Namely, the remote detection areas 103*a*, 103*b* are set so that the left and right arrays of Botts dots detected in step S23 are positioned at the centers of the respective remote detection areas 103*a*, 103*b* as viewed in the X-axis direction.

Next, the ECU 11 performs an operation to detect Botts dots, with respect to the close detection areas 102 and the remote detection areas 103 (step S28). The Botts-dots detecting operation is similar to the operation of step S23 as described above. Therefore, the detecting operation of step S28 will not be described in detail. After execution of step S28, the Botts-dots detecting process of FIG. 14 is finished.

Returning to FIG. 12, if the process of step S8 or step S9 is finished, the ECU 11 performs a certain operation or function (step S10), based on the detected road lane boundaries (i.e., white lines or Botts dots). For example, control of the steering wheel (such as so-called lane keeping assist) is performed as needed. Then, after the ECU 11 acquires another camera image (step S11), it returns to the above-indicated step S7 so as to repeat execution of step S7 and subsequent steps. At this point, explanation of the detecting process according to the first embodiment of the invention is finished.

As described above, in the Botts-dots detecting process of this embodiment, the size of the detection areas used in the initial finding stage and that of the detection areas used in the tracking stage are varied or made different from each other. Namely, the detection areas are limited to a close region of the vehicle in the initial finding stage, for an improvement in the accuracy with which Botts Dots are found, while controlling the processing load within a range that does not exceed the processing power of the ECU even if all-line scanning is performed. Once Botts dots are found and their positions are grasped, the width of the detection areas is further reduced with reference to the positions of the Botts dots, and a search for Botts dots is also conducted on a remote region as well as the close region of the vehicle. It is thus possible to increase the accuracy in detection of Botts dots during the tracking process while avoiding an increase in the overall processing load on the ECU. Thus, with regard to the Botts-dots detecting process that generally requires a large processing load for image processing, it is possible to achieve highly accurate detection of Botts dots while avoiding an increase in the overall processing load. It is also possible to detect Botts dots with high accuracy even with the ECU having relatively low processing power. Since highly accurate detection of Botts dots is possible even if a high-powered ECU is not employed, the cost of the vehicle may be advantageously reduced.

Next, a detection system according to a second embodiment of the invention will be described. The functional block diagram of the detection system is similar to that of the first embodiment (see FIG. 1). In this embodiment, however, the NVRAM 12 stores a program that is partially different from that of the first embodiment, and the ECU 11 executes the program so as to implement a different function from that of the first embodiment. More specifically, detection areas used in a process for detecting white lines are set in the same manner as that of the first embodiment for setting detection areas in the Botts-dots detecting process.

Figure 15:
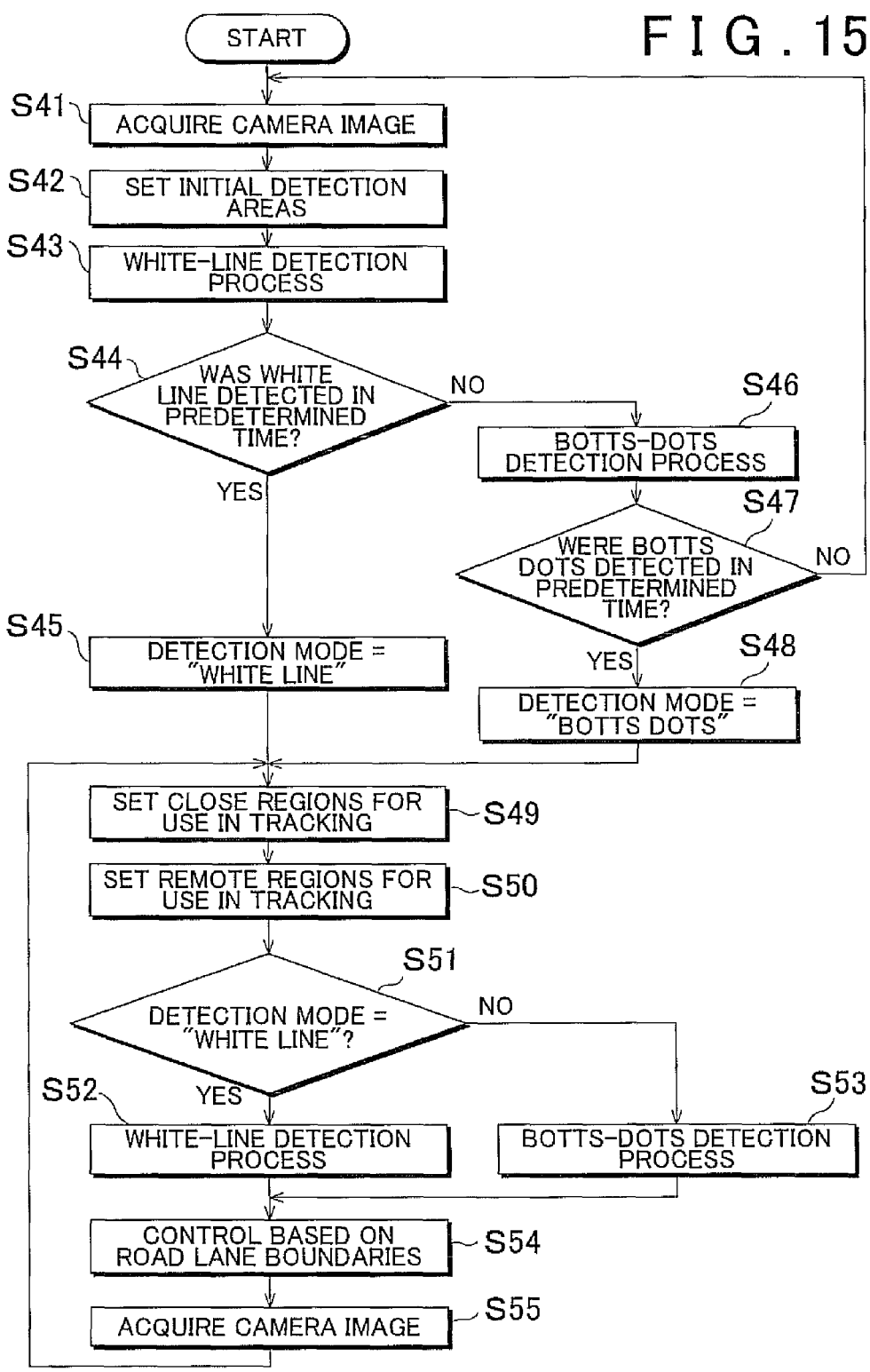
FIG. 15 is a flowchart illustrating the flow of a detecting process according to a second embodiment of the invention.
Figure 16:
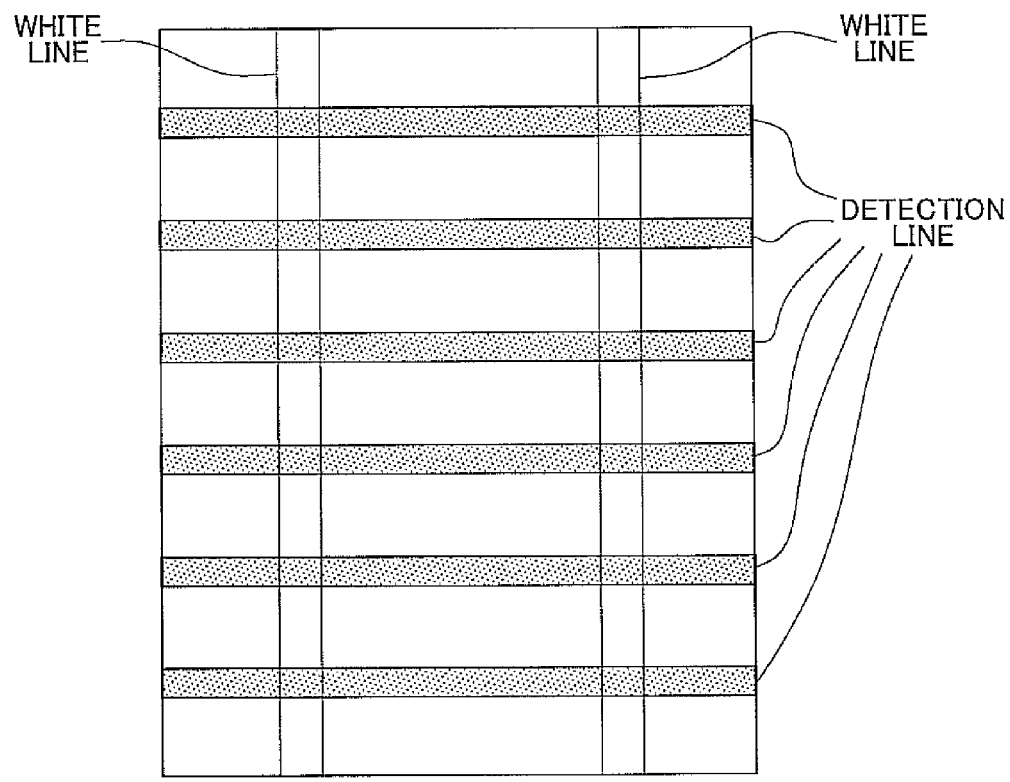
FIG. 16 is a view showing detection lines of the related art in real space.
Figure 17:
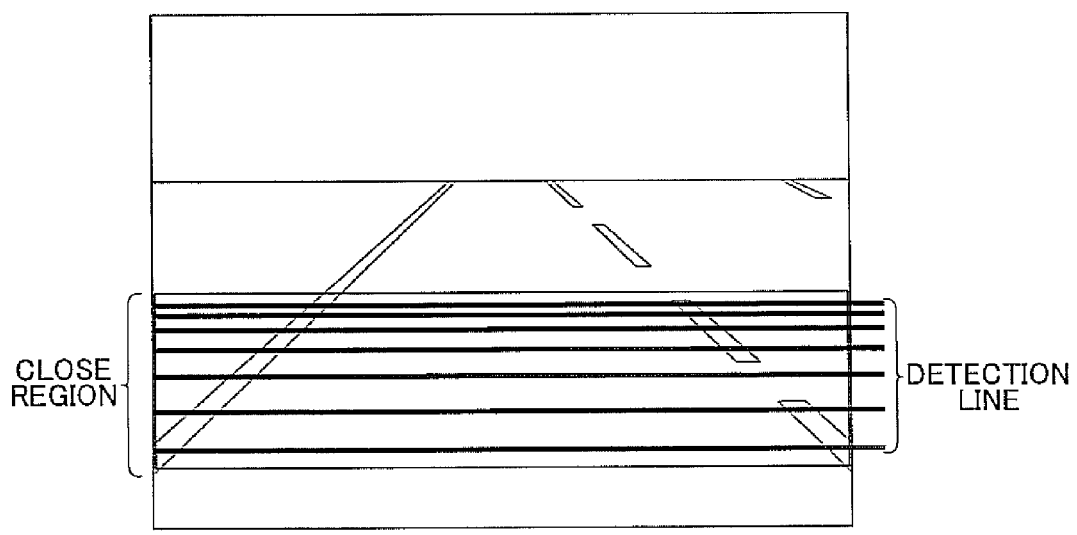
FIG. 17 is a view showing the detection lines on an image.

FIG. 15 is a flowchart showing details of a detecting process according to the second embodiment. In FIG. 15, the ECU 11 initially acquires a camera image (step S41), and sets initial detection areas 101 on the camera image (step S42).

More specifically, the ECU 11 reads initial detection area data 134 from the RAM 13, and sets the initial detection areas 101 on the camera image, based on the data.

Then, the ECU 11 performs a white-line detecting process with respect to the initial detection areas 101 (step S43). This process is substantially the same as that of step S3 as described above in the first embodiment; therefore, the process will not be described in detail.

Next, the ECU 11 determines whether any white line was detected within a predetermined time in step S43 (step S44). If it is determined that a white line (or lines) was detected in the predetermined time in step S43 (i.e., if an affirmative decision (YES) is obtained in step S44), the ECU 11 sets "WHITE LINE" as the detection mode 138 (step S45). Then, the ECU 11 proceeds to step S49 which will be described later.

If no white line was detected within the predetermined time in step S43 (i.e., if a negative decision (NO) is obtained in step S44), the ECU 11 performs a Botts-dots detecting process with respect to the initial detection areas 101 (step S46). The process for detecting Botts dots is substantially the same as that of step S23 as described above in the first embodiment; therefore, detailed description of the process will not be provided herein.

Next, the ECU 11 determines whether Botts dots were detected within a predetermined time in step S46 (step S47). If it is determined that Botts dots were detected within the predetermined time in step S46 (i.e., if an affirmative decision (YES) is obtained in step S47), the ECU 11 sets "BOTTS-DOTS" as the detection mode 138 (step S48). If, on the other hand, no Botts dots were detected within the predetermined time in step S46 (i.e., if a negative decision (NO) is obtained in step S47), the ECU 11 returns to the above-indicated step S41, and the routine is repeated.

Next, the ECU 11 performs an operation to set the close detection areas 102 (see FIG. 6) as described above (step S49). Furthermore, the ECU 11 performs an operation to set the remote detection areas 103 (see FIG. 6) as described above (step S50). The operations of steps S49 and S50 are substantially the same as those of steps S26 and S27 of the first embodiment, and therefore will not be explained herein.

Next, the ECU 11 determines whether the detection mode is "WHITE LINE" (step S51). If it is determined that the detection mode is "WHITE LINE" (i.e., if an affirmative decision (YES) is obtained in step S51), the ECU 11 executes a white-line detecting process similar to that of step S43, with respect to the close detection areas and remote detection areas set in steps S49 and S50 (step S52). If, on the other hand, the detection mode is not "WHITE LINE", namely, if the detection mode is "BOTTS DOTS" (a negative decision (NO) is obtained in step S51), the ECU 11 executes a Botts-dots detecting process similar to that of step S46, with respect to the close detection areas and remote detection areas (step S53).

If the process of step S52 or S53 is finished, the ECU 11 then performs a certain operation or function based on the detected road lane boundaries (white lines or Botts dots) (step S54). Thereafter, the ECU 11 acquires another camera image (step S55), and returns to step S49 to repeat execution of step S49 and subsequent steps. At this point, explanation of the detecting process according to the second embodiment is finished.

As described above, in the second embodiment, the size of the detection areas used in the initial finding stage and that of the detection areas used in the tracking stage are varied or made different from each other, during the white-line detecting process as well as the Botts-dots detecting process. As a result, the processing load required for detection of white lines can be reduced. Consequently, the processing load required for processing associated with road lane boundaries can be further reduced.

The road lane boundary detection system and detecting method according to the embodiments of the invention make it possible to detect road lane boundaries with high accuracy while avoiding an increase in the processing load, and are useful in, for example, a lane keeping assist system.

What is claimed is:

1. A road lane boundary detection system for detecting a road lane boundary provided on a road, from a road image that is a captured image of a road ahead of a vehicle, comprising:
   a detection region setting unit that sets a certain region in the road image, as a target detection region to be searched for detection of the road lane boundary; and
   a detecting unit that processes image data in the target detection region set by the detection region setting unit and that detects the road lane boundary,
   wherein the detection region setting unit includes:
   an initial detection region setting unit that sets, in the road image, an initial detection region of a certain size which is positioned close to the vehicle in real space and has a length in a width direction of the road, which is equal to or longer than a predetermined value, as the target detection region;
   a close detection region setting unit that sets a close detection region that is positioned close to the vehicle in real space, and has a length in the road width direction, which is shorter than that of the initial detection region, as the target detection region; and
   a remote detection region setting unit that sets a remote detection region that is positioned more remote from the vehicle than the close detection region in real space, and has a length in the road width direction, which is shorter than that of the close detection region, as the target detection region.
   wherein the detecting unit processes image data in the initial detection region if no road lane boundary is detected, so as to detect a road lane boundary, and processes image data in the close detection region and the remote detection region if the road lane boundary is detected, so as to detect the road lane boundary, and
   the close detection region and the remote detection region have the same size in the real space.

2. The road lane boundary detection system according to claim 1, wherein:
   the close detection region setting unit sets a position of the close detection region in the road width direction in the road image, based on a position of the road lane boundary detected by the detecting unit using the initial detection region; and
   the remote detection region setting unit sets a position of the remote detection region in the road width direction in the road image, based on the position of the road lane boundary detected by the detecting unit using the initial detection region.

3. The road lane boundary detection system according to claim 2, wherein:
   the close detection region setting unit sets the position of the close detection region in the road image, such that the road lane boundary detected by the detecting unit using the initial detection region is located at a center of the close detection region in the road width direction; and
   the remote detection region setting unit sets the position of the remote detection region in the road image, such that the road lane boundary detected by the detecting unit using the initial detection region is located at a center of the remote detection region in the road width direction.

4. The road lane boundary detection system according to claim 1, wherein the target detection region comprises a pair of regions that are separated from each other in the road width direction, and each of the regions has a width that contains a corresponding to one of left and right lane boundaries located to the left and right of the vehicle.

5. The road lane boundary detection system according to claim 1, wherein the road lane boundary comprises Botts dots.

6. A road lane boundary detecting method for detecting a road lane boundary provided on a road, from a road image that is a captured image of a road ahead of a vehicle, comprising:
 a detection region setting process of setting a certain region in the road image, as a target detection region to be searched for detection of the road lane boundary; and
 a detecting process of processing image data in the target detection region and detecting the road lane boundary,
 wherein, when the detection region setting process includes:
  an initial detection region setting process of setting, in the road image, an initial detection region of a certain size which is positioned close to the vehicle in real space and has a length in a width direction of the road, which is equal to or longer than a predetermined value, as the target detection region;
  a close detection region setting process of setting a close detection region that is positioned close to the vehicle in real space, and has a length in the road width direction, which is shorter than that of the initial detection region, as the target detection region; and
  a remote detection region setting process of setting a remote detection region that is positioned more remote from the vehicle than the close detection region in real space, and has a length in the road width direction, which is shorter than that of the close detection region, as the target detection region,
 wherein, if no road lane boundary is detected, image data in the initial detection region is processed so as to detect a road lane boundary, and if the road lane boundary is detected, image data in the close detection region and the remote detection region are processed so as to detect the road lane boundary, and
 the close detection region and the remote detection region have the same size in the real space.

* * * * *

UNITED STATES PATENT AND TRADEMARK OFFICE
CERTIFICATE OF CORRECTION

PATENT NO. : 8,090,152 B2
APPLICATION NO. : 12/472421
DATED : January 3, 2012
INVENTOR(S) : Shioya Kageyama et al.

It is certified that error appears in the above-identified patent and that said Letters Patent is hereby corrected as shown below:

At column 4, line number 22 delete "my" insert --may--.

At column 7, line number 37 delete "IFBotts" insert --If Botts--.

At column 8, line number 36 delete "27mm" insert --27m--.

At column 11, line number 9 delete "date" insert --data--.

At column 11, line number 14 delete "date" insert --data--.

At column 16, line number 37 delete "." insert --;--.

Signed and Sealed this
Sixth Day of November, 2012

David J. Kappos
*Director of the United States Patent and Trademark Office*